United States Patent [19]

Ishikawa et al.

[11] Patent Number: 5,393,146
[45] Date of Patent: Feb. 28, 1995

[54] ROLLING BEARING UNIT FOR SENSING ROTATIONAL SPEED

[75] Inventors: Shuichi Ishikawa, Nakai; Junshi Sakamoto, Fujisawa, both of Japan

[73] Assignee: NSK Ltd., Tokyo, Japan

[21] Appl. No.: 979,213

[22] Filed: Nov. 20, 1992

[30] Foreign Application Priority Data

Nov. 22, 1991 [JP] Japan .................................. 3-103735

[51] Int. Cl.⁶ .................................................. F16C 35/00
[52] U.S. Cl. ........................................ 384/448; 324/173
[58] Field of Search ............... 384/448; 324/173, 174

[56] References Cited

U.S. PATENT DOCUMENTS

| | | | |
|---|---|---|---|
| 4,904,936 | 2/1990 | Richmond | 324/174 |
| 4,907,445 | 3/1990 | Okumura | 324/173 |
| 4,978,234 | 12/1990 | Ouchi | 384/448 |
| 4,986,605 | 1/1991 | Descombes | 324/173 |
| 5,004,980 | 4/1991 | Ida et al. | 324/166 |
| 5,011,303 | 4/1991 | Caron | 384/448 |
| 5,140,261 | 8/1992 | Seo et al. | 324/173 |

FOREIGN PATENT DOCUMENTS

| | | |
|---|---|---|
| 400204 | 12/1990 | European Pat. Off. . |
| 401464 | 12/1990 | European Pat. Off. . |
| 457007 | 11/1991 | European Pat. Off. . |
| 2649457 | 1/1991 | France . |
| 3841654 | 6/1990 | Germany . |
| 3-6457 | 1/1991 | Japan . |

*Primary Examiner*—Daniel P. Stodola
*Assistant Examiner*—John Q. Nguyen
*Attorney, Agent, or Firm*—Foley & Lardner

[57] ABSTRACT

A rolling bearing unit for sensing rotational speed has a synthetic resin connector to which a plug is connected to output a signal from a senser, and a metal cover lot supporting and protecting the connector.

6 Claims, 3 Drawing Sheets

ROLLING BEARING UNIT FOR SENSING ROTATIONAL SPEED

FIELD OF THE INVENTION

The present invention relates to improvements in a rolling bearing unit for sensing rotational speed which is used for rotatably supporting the wheel of a vehicle and detecting its rotational speed.

BACKGROUND OF THE INVENTION

Conventional rolling bearing units of the type shown in FIG. 7 are used for rotatably supporting a vehicle wheel and detecting its rotational speed.

In FIG. 7, an inner ring assembly comprises a hub 1, an inner ring 4 which is fittingly engaged on an axially inner end portion (right end portion in FIG. 7) of the hub 1 and a nut 5 which is provided on the axially inner side of the hub 1.

The hub 1 has a flange 2 radially extending from an outer peripheral surface thereof for supporting a wheel and a disc rotor of a brake unit (not shown). A first inner raceway 3a is formed directly on an axially central portion of the outer peripheral surface of the hub 1, and a second inner raceway 3b is formed on an outer peripheral surface of the inner ring 4. A shoulder portion 6 is formed on an outer peripheral surface of the hub 1 between the first and second raceways 3a and 3b, so that the axially outer face of the inner ring 4 abuts the axially inner face of the shoulder portion 6.

The nut 5 is threaded onto a male-threaded portion formed on the outer peripheral surface of the axially inner end portion of the hub 1, and the inner ring 4 is fixedly clamped between the nut 5 and the shoulder portion 6.

A cylindrical portion 7 with a cylindrical outer peripheral surface is formed on the axially inner end of the hub 1 so as to protrude axially inward through the nut 5 (toward the right in FIG. 7).

A disk-shaped or annular pulse rotor 8 is made of a magnetic material such as a steel and press-fitted onto the protruding cylindrical portion 7.

A ribbed portion 9 having alternate grooves and ridges in a circumferential direction is formed on the axially inner face (right side face in FIG. 7) of the pulse rotor 8.

An outer ring assembly comprises a cylindrical outer ring 10 which is provided around the hub 1 with a space 15 therebetween. The outer ring 10 is provided with a flange 11 radially extending from an outer peripheral surface thereof and connected to a suspension unit knuckle (not shown) by means of the flange 11. First and second outer raceways 12a and 12b are formed on respective portions of the inner peripheral surface of the outer ring 10 to mate with the first and second inner raceways 3a and 3b, respectively. A plurality of rolling bodies (e.g., ball bearings) 13 are provided in the space 15 between the inner raceways 3a and 3b and the outer raceways 12a and 12b, so that the hub 1 is free to rotate inside the outer ring 10.

A seal 14 is supported in the opening section of the axially outer end (left end in FIG. 7) of the ring 10. The seal 14 has an inner rim with an elastic member which comes into slidable contact with a circumferential portion of the outer peripheral surface of the hub 1, so that the outer end opening of the space 15 to accommodate the plurality of rolling bodies 13 is sealingly covered. The axially inner end portion (right end in FIG. 7) of the outer ring 10 is provided with a metal cover 16 formed through deep drawing and engagingly fitted into the opening of the axially inner end portion of the outer ring 10. A sensor 17 for sensing rotational speed is fixed into the metal cover 16 so as to face the ribbed portion 9 on the pulse rotor 8.

With the rolling bearing unit for sensing rotational speed constructed as above, the hub 1 is able to rotate inside the outer ring 10 due to rotation of the plurality of rolling bodies 13 provided respectively between the inner raceways 3a and 3b and the outer raceways 12a and 12b, and the rotational speed of the hub 1 can be sensed by the sensor 17.

The output from the sensor 17 changes in accordance with the change in distance between a first or axially outer end face of the sensor 17 (left end in FIG. 7) and the surface of the ribbed portion 9 on a second or axially inner end face of the pulse rotor 8. The frequency of the change in output is proportional to the rotational speed of the hub 1 to which the pulse rotor 8 is fixed. Hence if the signal from the sensor 17 is input to a controller (not shown in the figure), the rotational speed of a wheel mounted on the hub 1 can be determined and used to control an antiskid or antilock braking system (ABS) or a traction control system (TCS).

With the rolling bearing unit for sensing rotational speed constructed as above, the signal detected by the sensor 17 and representing the rotational speed of the hub 1 is sent to a controller through a plug connector means. For example, as disclosed in First Publication of European Patent Application No. 0,401,464A2, a synthetic resin connector 18 is provided outside the cover 16 and directed radially as illustrated by dotted lines in the drawing for connection to a plug on the end of a lead to the controller. The synthetic resin connector 18 is formed integral with the synthetic resin body 19 in which the sensor 17 is embedded.

With the conventional rolling bearing unit constructed as above, however, the synthetic resin connector 18 is left exposed outside the metal cover 16. As a result, it is easily bumped against components, such as the knuckle, when the rolling bearing unit is being fitted onto the suspension unit. Hence, it may be easily deformed or damaged. If this occurs, it may be difficult or impossible to connect the mating plug with the synthetic resin connector 18.

There is also the possibility that the synthetic resin connector 18 may be damaged when connected with the mating plug during driving. This may occur when flying stones strike the synthetic resin connector 18 with high impact, thereby resulting in broken wires, insulation damage, and faulty connection.

SUMMARY OF THE INVENTION

The rolling bearing unit of the present invention for sensing rotational speed addresses the above mentioned problems.

It is an object of the present invention to provide a rolling bearing unit for sensing rotational speed of a wheel with its output plug connector means prevented from being damaged from outside.

DESCRIPTION OF THE PREFERRED EMBODIMENTS

The rolling bearing unit of the present invention for sensing rotational speed, as with the conventional rolling bearing unit, comprises an inner ring having an inner raceway on an outer peripheral surface thereof, a complementary outer ring having an outer raceway on an inner peripheral surface thereof, and a plurality of rolling bodies provided between the inner raceway and the outer raceway so that the inner ring and the complementary outer ring may rotate freely relative to each other.

One of the inner ring and the complementary outer ring is a rotating ring which rotates during use, while the other is a stationary or non-rotating ring.

The rolling bearing unit further has a pulse rotor which is made of a magnetic material and fixedly attached to the rotating ring with the rotation center of the pulse rotor being coaxial with the rotational axis of the rotating, a sensor which is supported on a stationary or non-rotating ring so as to face the pulse rotor, and a synthetic resin connector which is formed integral with the sensor for electrical connection thereto by way of, e.g., plastic molding, and protected from being damaged from outside, that is from being bumped or struck by any member outside. This is detailed hereinafter.

Specifically, the bearing unit of the present invention for sensing rotational speed has a metal cover for supporting the sensor and the resin connector and a supplemental metal cover for covering the outer surfaces of the synthetic resin connector. In addition, a metal element, either alone or together with the supplemental metal cover, can be formed as an insert which extends into the synthetic resin connector.

The rolling bearing unit of the present invention for sensing rotational speed is used to support a wheel so as to rotate freely relative to a suspension unit, and the actual operation of detecting the rotational speed of the wheel is substantially the same as for the conventional rolling bearing unit for sensing rotational speed.

Figure 1:
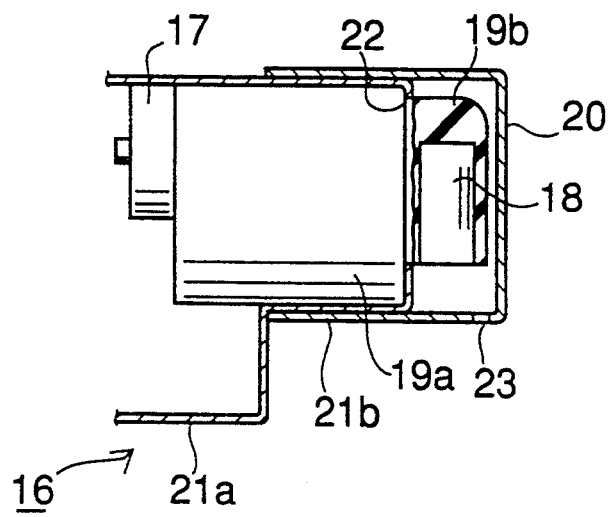
FIG. 1 is a sectional view showing a first embodiment of a sensor mounted to a cover of a rolling bearing unit according to the present invention with a portion broken away.
Figure 2:
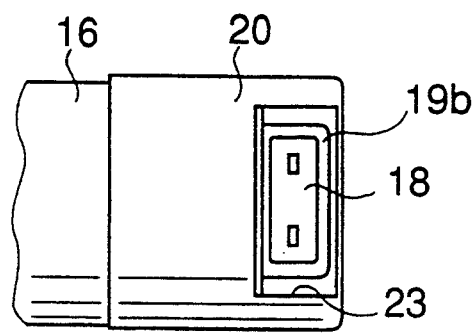
FIG. 2 is a view of the embodiment of FIG. 1 from beneath.
Figure 3:
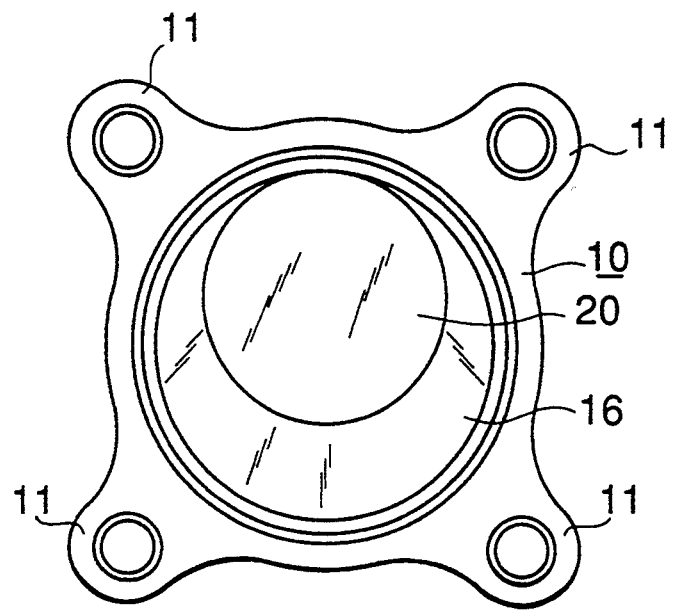
FIG. 3 is a view of the embodiment of FIG. 1 from the right in the drawing.
Figure 7:
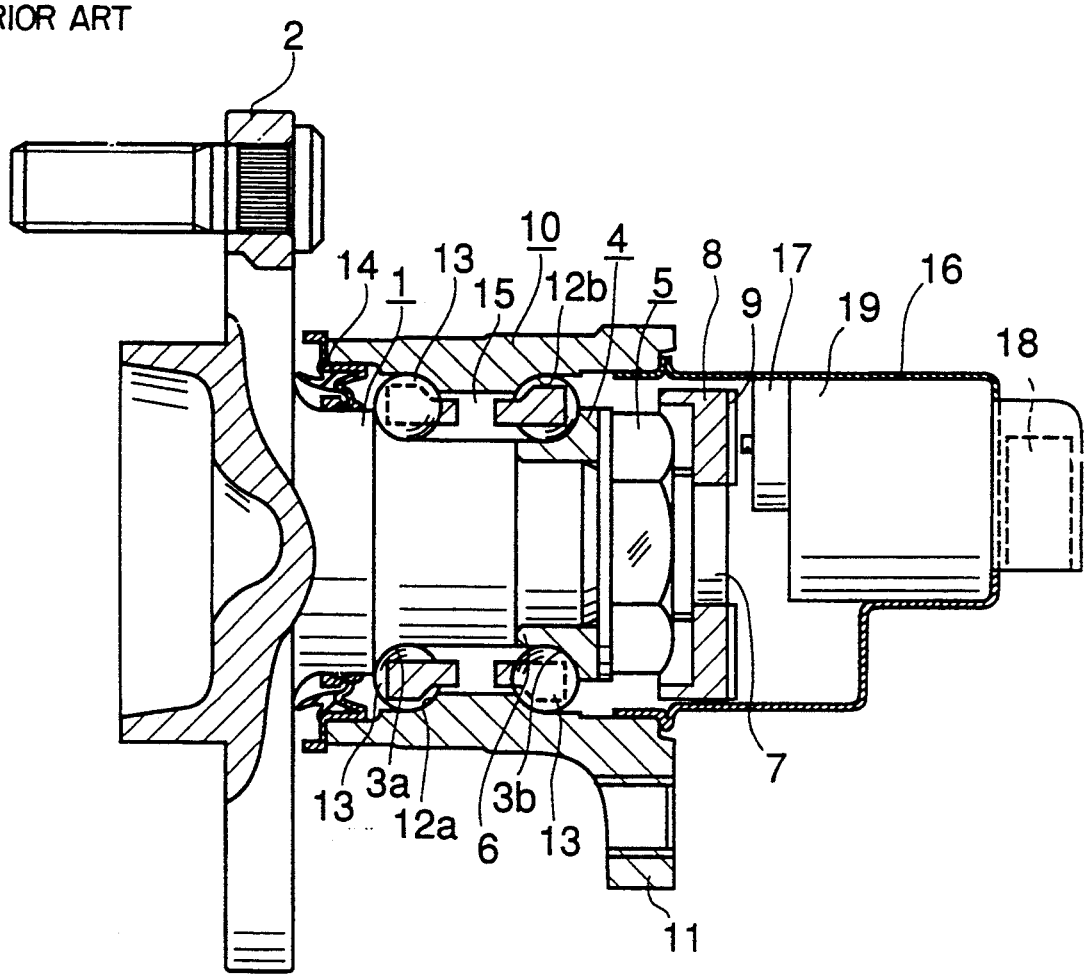
FIG. 7 is a sectional view showing an example of a prior art rolling bearing unit for sensing rotational speed.

FIGS. 1-3 show a first preferred embodiment of the present invention. The construction and operation of the rolling bearing unit of the present invention are substantially the same as for the above mentioned conventional rotational bearing unit as shown in FIG. 7, except that a supplemental metal cover 20 is provided for protection of the synthetic resin connector 18. Similar parts are therefore not represented in the figures nor described in the following detailed description of the features of the present invention.

A metal cover 16 comprises a larger diameter portion 21a which is engagingly fixed to the axially inner end opening of the outer ring 10 and a smaller diameter portion 21b which protrudes from the axially inner end face of the larger diameter portion 21a. The smaller diameter portion 21b is formed in a cylindrical shape with a bottom having a hole 22 formed through the bottom.

A sensor 17 is held in the protruding portion 21b through the bottom hole 22 by means of a synthetic resin body 19a which is molded into the protruding portion 21b. The synthetic resin body 19a also protrudes out from the axially inner end of the protruding portion 21b through the bottom hole 22 to form a synthetic resin body 19b surrounding the synthetic resin connector 18 except for its opening in a radial direction. Accordingly, the synthetic resin body 19a provided within the protruding portion 21b is joined with the synthetic resin connector 18 provided outside the protruding portion 21b, so that the synthetic resin connector 18 and the sensor 17 are formed as an integral body. That is to say, the synthetic resin connector 18 and the sensor 17 are connected together by the synthetic resin bodies 19a and 19b through the hole 22 formed in the axially inner end face of the protruding portion 21b.

With the rolling bearing unit of the present invention, the outer surfaces of the synthetic resin connector 18 are protected by a supplemental metal cover, specifically a cylindrical cover 20 with a circular bottom, which is made of stainless steel through drawing. The supplemental metal cover 20 is engagingly fitted over the protruding portion 21b in a telescopic relationship. An access hole 23 is formed in the peripheral face of the supplemental metal cover 20 to be opened in a radial direction in alignment with the synthetic resin connector 18 so that a mating plug may be easily inserted into and withdrawn from the synthetic resin connector 18 through the access hole 23.

The supplemental metal cover 20 protects the synthetic resin connector 18, so that at the time of assembling the rolling bearing unit for sensing rotational speed to the suspension unit, the synthetic resin connector 18 is prevented from being hit by components such as the knuckle, and thereby damaged or deformed. Hence, problems associated with connecting the synthetic resin connector 18 and its mating plug are reduced.

Furthermore, the supplemental metal cover 20 protects the synthetic resin connector 18 from being struck by stones thrown up from the road during driving. Hence, problems with broken wires in the synthetic resin connector 18, and faulty contacts, are avoided.

The reliability of the rolling bearing unit is thus improved in sensing rotational speed. Furthermore, even if the supplemental metal cover 20 loosens on the protruding portion 21b, the supplemental metal cover 20 cannot come off the protruding portion 21b once the mating plug has been inserted into the synthetic resin connector 18. Also, with the first embodiment shown in FIG. 1 to FIG. 3, the mating plug (or connector) connected to the synthetic resin connector 18 may also be protected by the supplemental metal cover 20, resulting in further improvement.

Specifically, problems with connecting a mating plug to the synthetic resin connector, or broken wires in the synthetic resin connector may be overcome. The reliability of the rolling bearing unit is thus improved in sensing rotational speed.

Figure 4:
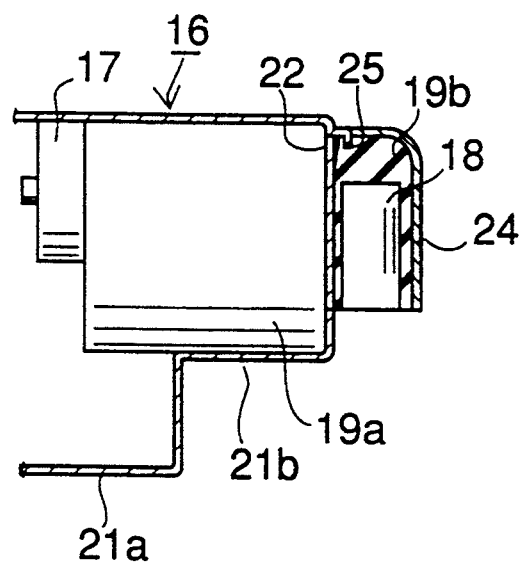
FIG. 4 is a sectional view showing a second embodiment of a sensor mounted to a cover of a rolling bearing unit according to the present invention with a portion broken away.
Figure 5:
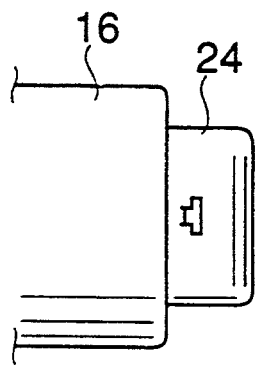
FIG. 5 is a view of the embodiment of FIG. 4 from above.
Figure 6:
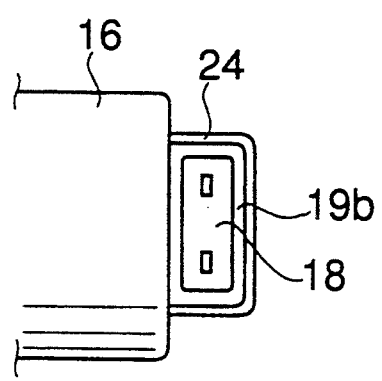
FIG. 6 is view of the embodiment of FIG. 4 from beneath.

FIGS. 4 and 5 show a second preferred embodiment of the present invention. In this case, a supplemental metal cover 24 is formed to a size coinciding with the outer surface of the synthetic resin connector 18, and is fixed to the outer surface during injection molding of the synthetic resin connector 18. A portion of the supplemental metal cover 24 is bent inwards to form a T-shaped tongue or tab 25 so as to be anchored in the synthetic resin of the connector 18 at the time of molding, thereby improving the connection strength between the supplemental metal cover 24 and the synthetic resin connector 18.

Other details of construction and operation are substantially the same as for the first embodiment. Although not shown in the figure, further improvement may be effected by covering a portion of the radially outer end of the synthetic resin connector 18 by bending the open end rim portion of the supplemental metal cover 24 (lower rim portion in FIG. 4) inwards.

Since certain changes may be made in the above apparatus without departing from the scope of the invention herein involved, it is intended that all matter contained in the above description or shown in the accompanying drawings shall be interpreted as illustrative and not in a limiting sense. For example, the strength may also be reinforced by providing a metal element embedded as an insert (not shown), e.g., extending from the protruding portion 21b in the synthetic resin connector 18 in conjunction with, or instead of, the supplemental metal cover 24.

In addition, although the supplemental metal cover 20 is mounted to the protruding portion 21b in a telescopic relationship, the supplemental metal cover 20 can be integrally made with the protruding portion 21b. Thus, the supplemental cover 20 and the metal cover 21a and 21b are formed in a one piece structure and molded together with the synthetic resin connector by a synthetic resin body.

Accordingly, with the rolling bearing unit of the present invention for sensing rotational speed, the synthetic resin connector for output of the signal from the sensor is kept from being damaged or distorted by means of a metal cover and/or metal insert which protect and reinforce the synthetic resin connector.

With the rolling bearing unit of the present invention, problems with distortion or damage of the synthetic resin connector which may cause difficulty in connecting the connector and mating plug, and problems with broken wires and faulty connection at the connector may be overcome.

What is claimed is:

1. A rolling bearing unit for sensing rotational speed comprising:
   a rotating ring,
   a stationary ring,
   a plurality of rolling bodies provided between the rotating ring and the stationary ring,
   a pulser ring mounted to the rotating ring,
   a sensor mounted to the stationary ring so as to oppose the pulser ring to detect rotations of the rotating ring,
   a synthetic resin connector integrally connected to the sensor to output a signal from the sensor,
   a metal cover which supports the sensor and the synthetic resin connector, and
   a supplemental metal member for protecting the synthetic resin connector, said supplemental member being connected to the metal cover in a telescopic fitting relationship, said supplemental member extending from the metal cover to substantially enclose the synthetic resin connector.

2. The rolling bearing unit of claim 1, wherein the rotating ring includes a hub for supporting a wheel and an inner ring mounted to the hub, and the stationary ring includes an outer ring opposing the inner ring to accommodate the rolling bodies therebetween.

3. A rolling bearing unit for sensing rotational speed comprising:
   a rotating ring;
   a stationary ring;
   a plurality of rolling bodies provided between the rotating ring and the stationary ring;
   a pulser ring mounted to the rotating ring;
   a sensor mounted to the stationary ring so as to oppose the pulser ring to detect rotations of the rotating ring;
   a synthetic resin connector integrally connected to the sensor to output a signal from the sensor;
   a metal cover which supports the sensor and the synthetic resin connector in a manner such that the synthetic resin connector protrudes from the metal cover, said metal cover having a cylindrical portion; and
   a supplemental metal cover which covers exterior surfaces of the synthetic resin connector, wherein said supplemental cover is a hollow cylinder having a base and a wall portion which fits over the cylindrical portion of the metal cover, and wherein said wall portion of the supplemental metal cover is formed with an access hole in radial alignment with the synthetic resin connector.

4. The rolling bearing unit of claim 3, wherein the synthetic resin connector and the sensor are supported by a synthetic resin body.

5. The rolling bearing unit of claim 4, wherein a portion of the synthetic resin body which supports the synthetic resin connector protrudes from the metal cover and is formed within the supplemental metal cover by injection molding.

6. The rolling bearing unit of claim 4, wherein the cylindrical portion of the metal cover has a base defining a hole therein, and said synthetic resin body is formed substantially within the cylindrical portion of the metal cover while protruding through the hole in the base to support the synthetic resin connector.

* * * * *